(12) United States Patent
Lewkow et al.

(10) Patent No.: US 9,319,980 B1
(45) Date of Patent: Apr. 19, 2016

(54) EFFICIENT DIGITAL IMAGE DISTRIBUTION

(71) Applicant: Google Inc., Mountain View, CA (US)

(72) Inventors: Roman Lewkow, Mountain View, CA (US); Ryan Geiss, Mountain View, CA (US)

(73) Assignee: Google Inc., Mountain View, CA (US)

( * ) Notice: Subject to any disclaimer, the term of this patent is extended or adjusted under 35 U.S.C. 154(b) by 108 days.

(21) Appl. No.: 14/067,182

(22) Filed: Oct. 30, 2013

(51) Int. Cl.
*H04B 1/38* (2015.01)
*H04W 52/02* (2009.01)
*H04W 88/08* (2009.01)
*H04W 84/12* (2009.01)
*H04W 4/00* (2009.01)

(52) U.S. Cl.
CPC .............. *H04W 52/02* (2013.01); *H04W 4/008* (2013.01)

(58) Field of Classification Search
USPC ........ 455/41.2, 566, 569.1, 574, 575.1, 575.2
See application file for complete search history.

(56) References Cited

U.S. PATENT DOCUMENTS

| 6,711,414 | B1 | 3/2004 | Lightman et al. | |
|---|---|---|---|---|
| 8,005,454 | B1 | 8/2011 | Lavelle et al. | |
| 8,862,186 | B2 * | 10/2014 | Jacobsen et al. | 455/566 |
| 2001/0019362 | A1 | 9/2001 | Nakamura et al. | |
| 2008/0253311 | A1 | 10/2008 | Jin | |
| 2009/0231468 | A1 | 9/2009 | Yasuda | |
| 2011/0199931 | A1 | 8/2011 | Anderson et al. | |
| 2011/0208984 | A1 | 8/2011 | Naware et al. | |
| 2013/0215812 | A1 | 8/2013 | Hu et al. | |
| 2013/0294303 | A1 * | 11/2013 | Vyas et al. | 370/311 |
| 2015/0009874 | A1 * | 1/2015 | Edara | H04W 52/0225 370/311 |
| 2015/0073980 | A1 * | 3/2015 | Griffin et al. | 705/39 |

OTHER PUBLICATIONS

Office Action for U.S. Appl. No. 13/849,824 mailed Nov. 5, 2014, 14 pages.

* cited by examiner

*Primary Examiner* — Blane J Jackson
(74) *Attorney, Agent, or Firm* — McDonnell Boehnen Hulbert & Berghoff LLP

(57) ABSTRACT

A wearable computing device may receive a data transmission schedule from a wirelessly tethered camera device. The wearable computing device may include a data receiver, and the data transmission schedule may be based on a frame rate and a resolution of the camera device. Possibly in response to receiving the data transmission schedule, the wearable computing device may be readied to receive a data transmission of the data transmission schedule. With the data receiver, the wearable computing device may receive the data transmission. In response to completing the reception of the data transmission, the wearable computing device may power down the data receiver.

20 Claims, 15 Drawing Sheets

EFFICIENT DIGITAL IMAGE DISTRIBUTION

BACKGROUND

Computing systems, such as personal computers, laptop computers, tablet computers, cellular phones, and countless types of Internet-capable devices, are prevalent in numerous aspects of modern life. Over time, the manner in which these devices are providing information to users is becoming more intelligent, more efficient, more intuitive, and/or less obtrusive. The trend toward miniaturization of computing hardware, peripherals, as well as of sensors, detectors, and image and audio processors, among other technologies, has helped open up a field sometimes referred to as "wearable computing." However, many wearable computing devices operate on battery power. Therefore, it is desirable to reduce the power requirements of these devices.

SUMMARY

Wearable computing devices may support various local wireless communication technologies, such as Wifi and/or BLUETOOTH®, and/or wide-area wireless communication technologies, such as GSM, CDMA, and/or LTE, to communicate with nearby or remote devices, respectively. In typical wireless communication technologies, there may be an asymmetry in the power duty cycle of the transmitting device and the receiving device. In order to reduce the power requirements of a receiving device, communication protocol mechanisms may be used between the transmitting device and receiving device to control the data flow between these devices. Then, the receiving device can power down its receiver between receptions of data bursts.

In an example embodiment, a wearable computing device may receive a data transmission schedule from a wirelessly tethered camera device. The wearable computing device may include a data receiver, and the data transmission schedule may be based on a frame rate, a resolution of the camera device, and/or the throughput of the transmission channel between the devices. Possibly in response to receiving the data transmission schedule, the wearable computing device may be readied to receive a data transmission of the data transmission schedule. With the data receiver, the wearable computing device may receive the data transmission. Possibly in response to completing the reception of the data transmission, the wearable computing device may power down the data receiver.

In another example embodiment, a wearable computing device may include a data receiver configured to, when powered up, receive data transmissions via a data channel and from a wirelessly tethered camera device. The data transmissions may be based on a frame rate, a resolution of the camera device, and/or the throughput of the transmission channel between the devices. The wearable computing device may also include a display mechanism configured to display representations of the received data transmissions. The wearable computing device may further include a communications module configured to receive a data transmission schedule from the camera device, ready the wearable computing device to receive a data transmission of the data transmission schedule, receive the data transmission, and power down the data receiver after completing the reception of the data transmission.

In yet another example embodiment, an article of manufacture may include a non-transitory computer-readable medium, having stored thereon program instructions that, upon execution by a wearable computing device, cause the wearable computing device to perform operations. These operations may involve receiving a data transmission schedule from a wirelessly tethered camera device, where the wearable computing device includes a data receiver, and where the data transmission schedule is based on a frame rate, a resolution of the camera device, and/or the throughput of the transmission channel between the devices. The operations may also involve readying the wearable computing device to receive a data transmission of the data transmission schedule. The operations may further involve receiving, with the data receiver, the data transmission at the wearable computing device. The operations may additionally involve, possibly in response to completing the reception of the data transmission, powering down the data receiver.

In a further example embodiment, a system may include: (a) means for receiving a data transmission schedule from a wirelessly tethered camera device, where the wearable computing device includes a data receiver, and where the data transmission schedule is based on a frame rate, a resolution of the camera device, and/or the throughput of the transmission channel between the devices, (b) means for readying the wearable computing device to receive a data transmission of the data transmission schedule, (c) means for receiving, with the data receiver, the data transmission at the wearable computing device, and (d) means for, in response to completing the reception of the data transmission, powering down the data receiver.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1A:
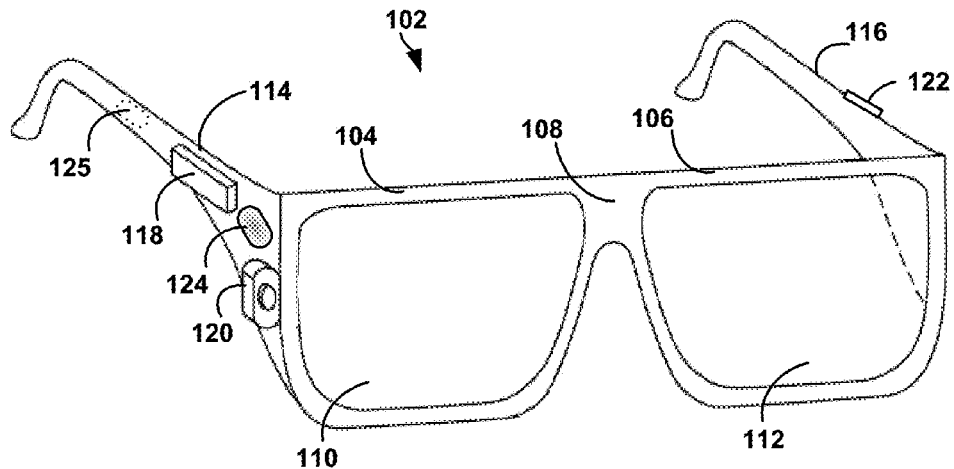
FIG. 1A illustrates a wearable computing device, according to an example embodiment.

Example methods and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

1. OVERVIEW

In the area of image and visual processing and production, in particular, it has become possible to consider wearable displays that place a very small image display element close enough to a wearer's (or user's) eye(s) such that the displayed image fills or nearly fills the field of view, and appears as a normal sized image, such as might be displayed on a traditional image display device. The relevant technology may be referred to as "near-eye displays."

Wearable computing devices with near-eye displays may also be referred to as "head-mountable displays" (HMDs), "head-mounted displays," "head-mounted devices," or "head-mountable devices." An HMD places a graphic display or displays close to one or both eyes of a wearer. To generate the images on a display, a computer processing system may be used. Such displays may occupy a wearer's entire field of view, or only occupy part of wearer's field of view. Further, head-mounted displays may vary in size, taking a smaller form such as a glasses-style display or a larger form such as a helmet, for example.

HMDs can be tethered, paired, or otherwise wirelessly connected to, e.g., smartphones, to extend their capabilities. In an example embodiment, an HMD could be tethered or paired to a smartphone with one or more cameras, or to a stand-alone camera.

As noted above, in typical wireless communication technologies, there may be an asymmetry in the power duty cycle of a transmitting device, such as an HMD, and a receiving device, such as a smartphone or camera. As a result, the receiving device may use more power than is actually necessary, because the receiving device may maintain its receiver in a powered-up state while waiting for transmissions to arrive. For instance, current wireless local area network technologies, such as Wifi, may require more power to operate in the receive mode than in transmit mode. This observation may appear counter-intuitive at first, because transmitting devices use power to generate the energy, e.g., radio waves, acoustic energy, or optical energy, which can be used to transfer data, while a receiving device may require less power to receive this data. However, there often is no mechanism for powering down the receiving device circuitry between data bursts, because the receiving device does not know when these data bursts will arrive and, unlike the transmitting device, might not be able to power down the interface even when there is not data being transmitted. Therefore, in certain cases, the receiving device may be more demanding in power budget than the transmitting device. Such behavior may be especially problematic in battery-powered wearable computing devices, because it may be inconvenient for users to have to frequently charge these devices.

For instance, in some embodiments, a wearable computing device with an HMD may be used as a display terminal for other data sources. One such example would be the HMD being used as a remote control panel and/or a viewfinder for a wirelessly tethered camera device. In this case, the HMD may receive a series of one or more images, perhaps in the form of a video stream, and display these images for the user. The receiver of the HMD may remain on in order to receive these images.

In order to reduce the power requirements of a receiving device, communication protocol mechanisms may be used between the transmitting device and receiving device to control the data flow between these devices. Then, the receiving device can power down its receiver between data bursts. Several possible embodiments follow.

In one embodiment, the transmitting device and receiving device may use in-band negotiation of a duty cycle for future data transmissions. For instance, over a Wifi link, these devices may negotiate a schedule for future data transmissions using that link. In a simple example, the devices may agree that the transmitting device will transmit a burst of data for m milliseconds every n milliseconds, where m<n. Then, the receiving device can power down its receiver (e.g., enter a low-power mode or turn the receiver off) for up to n-m milliseconds per duty cycle.

Optionally, the receiver may remain powered up for a "hang time" of an additional h milliseconds per duty cycle, where m+h<n, to ensure that all of the data burst is received. Further, the receiver may power up with a sufficient temporal margin before the scheduled data burst to ensure that it is ready to receive that data burst. In an alternate embodiment, at the end of each data burst, the transmitting device may indicate to the receiving device how long that it can safely power down its receiver, and/or when the next transmission will occur.

In the example of the transmitting device being a wireless camera, the transmission rate may be determined based on the frame rate of the camera multiplied by the resolution of the camera. A frame rate of a camera device may refer to the rate at which the camera device captures consecutive images. For instance, a common frame rate used by video cameras to capture full motion video is 24 or 30 frames per second. The resolution of the camera may refer to the number of pixels in each captured image. As an example, the resolution of 1080p high definition (HD) video is 1920×1080 pixels, resulting in a total of 2,073,600 pixels per frame. If each pixel is represented with 8 bits, the transmission rate of uncompressed 24 frame-per-second 1080p HD video is 398,131,200 bits per second, or approximately 398 megabits per second). Smaller frame sizes may be used in viewfinding or preview applications, resulting in lower data rates.

However, video frames are typically compressed before transmission, which may result in the transmission rate of such video to be far lower than this number (e.g., as low as 4-8 megabits per second or even lower). Thus, in some cases, the transmission rate may be based on an expected data compression ratio as well.

The duty cycle of a data receiver may be determined by the ratio of the transmission rate to the expected capacity of the wireless link between the transmitting device and receiving device. For instance, suppose that the transmission rate is t bits per second and the expected capacity is c bits per second, where t<c. Then, the duty cycle may be represented by any schedule that results in the transmitting device transmitting for t/c of any unit of time. This sort of duty cycle may be used for any type of data transmission, but may work best when the expected data transmission rate is known and relatively constant.

In another example, a low-power, low-bandwidth secondary wireless link (e.g., low-power mode BLUETOOTH®) may be used by the transmitting device to notify the receiving device that a data burst is ready for transmission over the main wireless link (e.g., Wifi). The receiving device may turn on its main receiver upon reception of such a message from the transmitting device. The receiving device may then transmit a "receiving device ready" signal, over the secondary wireless link and to the transmitting device, to initiate the data burst. This protocol explicitly signals the arrival of each data burst, and may work well with data transmissions for which the expected data rate is unknown or highly variable (e.g., web browsing traffic or variable-bit-rate (VBR) video).

In another example, the transmitting device may start sending, over the data channel, a continuous "data transmission ready" message when it is ready to transfer a data burst. The receiving device may power up its receiver periodically for a short time to check for such a message. When the receiving device detects the "data transmission ready" message it leaves the receiver powered up and transmits a "ready to receive" signal to the transmitting device to initiate the data burst. This protocol may also work well where the expected data rate is unknown or highly variable.

2. EXAMPLE WEARABLE COMPUTING DEVICES

Systems and devices in which example embodiments can be implemented will now be described in greater detail. In general, an example system can be implemented in or can take the form of a wearable computing device (also referred to as a wearable computer). In an example embodiment, a wearable computing device takes the form of, or includes, an HMD.

An example system can also be implemented in or take the form of other devices, such as a mobile phone, among other possibilities. Further, an example system can take the form of non-transitory computer readable medium, which has program instructions stored thereon that are executable by a processor to provide the functionality described herein.

An HMD can generally be any display device that is capable of being worn on the head and that places a display in front of one or both eyes of the wearer. An HMD can take various forms such as a helmet or eyeglasses. As such, references to "eyeglasses" or a "glasses-style" HMD should be understood to refer to an HMD that has a glasses-like frame so that it can be worn on the head. Further, example embodiments can be implemented by or in association with an HMD with a single display or with two displays, which can be referred to as a "monocular" HMD or a "binocular" HMD, respectively.

FIG. 1A illustrates a wearable computing device according to an example embodiment. In FIG. 1A, the wearable computing device takes the form of HMD 102. It should be understood, however, that example systems and devices can take the form of or be implemented within or in association with other types of devices, without departing from the scope of the invention. As illustrated in FIG. 1A, HMD 102 includes frame elements including lens-frames 104, 106 and center frame support 108, lens elements 110, 112, and extending side-arms 114, 116. Center frame support 108 and extending side-arms 114, 116 are configured to secure HMD 102 to a user's face via a user's nose and ears, respectively.

Each of frame elements 104, 106, and 108 and extending side-arms 114, 116 can be formed of a solid structure of plastic and/or metal, or can be formed of a hollow structure of similar material so as to allow wiring and component interconnects to be internally routed through HMD 102. Other materials may be used to form the frame elements as well.

One or more of each of lens elements 110, 112 can be formed of any material that can suitably display a projected image or graphic. Each of lens elements 110, 112 can also be sufficiently transparent to allow a user to see through the lens element. Combining these two features of the lens elements can facilitate an augmented reality or heads-up display where the projected image or graphic is superimposed over a real-world view as perceived by the user through the lens elements.

Extending side-arms 114, 116 can each be projections that extend away from lens-frames 104, 106, respectively, and can be positioned behind a user's ears to secure HMD 102 to the user. Extending side-arms 114, 116 can further secure HMD 102 to the user by extending around a rear portion of the user's head. Additionally or alternatively, for example, HMD 102 can connect to or be affixed within a head-mounted helmet structure. Other configurations for an HMD are also possible.

HMD 102 can also include on-board computing system 118, image capture device 120, sensor 122, and finger-operable touch pad 124. On-board computing system 118 is shown to be positioned on extending side-arm 114 of HMD 102; however, on-board computing system 118 can be provided on other parts of HMD 102 or can be remotely positioned from HMD 102 (e.g., on-board computing system 118 could be wire- or wirelessly-connected to HMD 102). On-board computing system 118 can include a processor and memory, for example. On-board computing system 118 can be configured to receive and analyze data from image capture device 120 and finger-operable touch pad 124 (and possibly from other sensory devices, user interfaces, or both) and generate images for output by lens elements 110 and 112.

Image capture device 120 can be, for example, a camera that is configured to capture still images and/or to capture video. In the illustrated configuration, image capture device 120 is positioned on extending side-arm 114 of HMD 102; however, image capture device 120 can be provided on other parts of HMD 102. Image capture device 120 can be configured to capture images at various resolutions or at different frame rates. Many image capture devices with a small form-factor, such as the cameras used in mobile phones or webcams, for example, can be incorporated into an example of HMD 102.

Further, although FIG. 1A illustrates one image capture device 120, more image capture devices can be used, and each can be configured to capture the same view, or to capture different views. For example, image capture device 120 can be forward facing to capture at least a portion of the real-world view perceived by the user. This forward facing image captured by image capture device 120 can then be used to generate an augmented reality where computer generated images appear to interact with or overlay the real-world view perceived by the user.

Sensor 122 is shown on extending side-arm 116 of HMD 102; however, sensor 122 can be positioned on other parts of HMD 102. For illustrative purposes, only one sensor 122 is shown. However, in an example embodiment, HMD 102 can include multiple sensors. For example, HMD 102 can include sensors such as one or more gyroscopes, one or more accelerometers, one or more magnetometers, one or more light sensors, one or more infrared sensors, and/or one or more microphones. Other sensing devices can be included in addition or in the alternative to the sensors that are specifically identified herein.

Finger-operable touch pad 124 is shown on extending side-arm 114 of HMD 102. However, finger-operable touch pad 124 can be positioned on other parts of HMD 102. Also, more than one finger-operable touch pad can be present on HMD 102. Finger-operable touch pad 124 can be used by a user to input commands. Finger-operable touch pad 124 can sense at least one of a pressure, position and/or a movement of one or more fingers via capacitive sensing, resistance sensing, or a surface acoustic wave process, among other possibilities. Finger-operable touch pad 124 can be capable of sensing movement of one or more fingers simultaneously, in addition to sensing movement in a direction parallel or planar to the pad surface, in a direction normal to the pad surface, or both, and can also be capable of sensing a level of pressure applied to the touch pad surface. In some embodiments, finger-operable touch pad 124 can be formed of one or more translucent or transparent insulating layers and one or more translucent or transparent conducting layers. Edges of finger-operable touch pad 124 can be formed to have a raised, indented, or roughened surface, so as to provide tactile feedback to a user when the user's finger reaches the edge, or other area, of finger-operable touch pad 124. If more than one finger-operable touch pad is present, each finger-operable touch pad can be operated independently, and can provide a different function.

In a further aspect, HMD 102 can be configured to receive user input in various ways, in addition or in the alternative to user input received via finger-operable touch pad 124. For example, on-board computing system 118 can implement a speech-to-text process and utilize a syntax that maps certain spoken commands to certain actions. In addition, HMD 102 can include one or more microphones via which a wearer's speech can be captured. Configured as such, HMD 102 can be operable to detect spoken commands and carry out various computing functions that correspond to the spoken commands.

As another example, HMD 102 can interpret certain head-movements as user input. For example, when HMD 102 is worn, HMD 102 can use one or more gyroscopes and/or one or more accelerometers to detect head movement. HMD 102 can then interpret certain head-movements as being user input, such as nodding, or looking up, down, left, or right. An HMD could also pan or scroll through graphics in a display according to movement. Other types of actions can also be mapped to head movement.

As yet another example, HMD 102 can interpret certain gestures (e.g., by a wearer's hand or hands) as user input. For example, HMD 102 can capture hand movements by analyzing image data from image capture device 120, and initiate actions that are defined as corresponding to certain hand movements.

As a further example, HMD 102 can interpret eye movement as user input. In particular, HMD 102 can include one or more inward-facing image capture devices and/or one or more other inward-facing sensors (not shown) that can be used to track eye movements and/or determine the direction of a wearer's gaze. As such, certain eye movements can be mapped to certain actions. For example, certain actions can be defined as corresponding to movement of the eye in a certain direction, a blink, and/or a wink, among other possibilities.

HMD 102 also includes a speaker 125 for generating audio output. In one example, the speaker could be in the form of a bone conduction speaker, also referred to as a bone conduction transducer (BCT). Speaker 125 can be, for example, a vibration transducer or an electroacoustic transducer that produces sound in response to an electrical audio signal input. The frame of HMD 102 can be designed such that when a user wears HMD 102, speaker 125 makes contact with the wearer. Alternatively, speaker 125 can be embedded within the frame of HMD 102 and positioned such that, when HMD 102 is worn, speaker 125 vibrates a portion of the frame that contacts the wearer. In either case, HMD 102 can be configured to send an audio signal to speaker 125, so that vibration of the speaker can be directly or indirectly transferred to the bone structure of the wearer. When the vibrations travel through the bone structure to the bones in the middle ear of the wearer, the wearer can interpret the vibrations provided by speaker 125 as sounds.

Various types of bone-conduction transducers (BCTs) can be implemented, depending upon the particular implementation. Generally, any component that is arranged to vibrate HMD 102 can be incorporated as a vibration transducer. Yet further it should be understood that an HMD can include a single speaker or multiple speakers. In addition, the location (s) of speaker(s) on the HMD can vary, depending upon the implementation. For example, a speaker can be located proximate to a wearer's temple (as shown), behind the wearer's ear, proximate to the wearer's nose, and/or at any other location where speaker 125 can vibrate the wearer's bone structure.

Figure 1B:
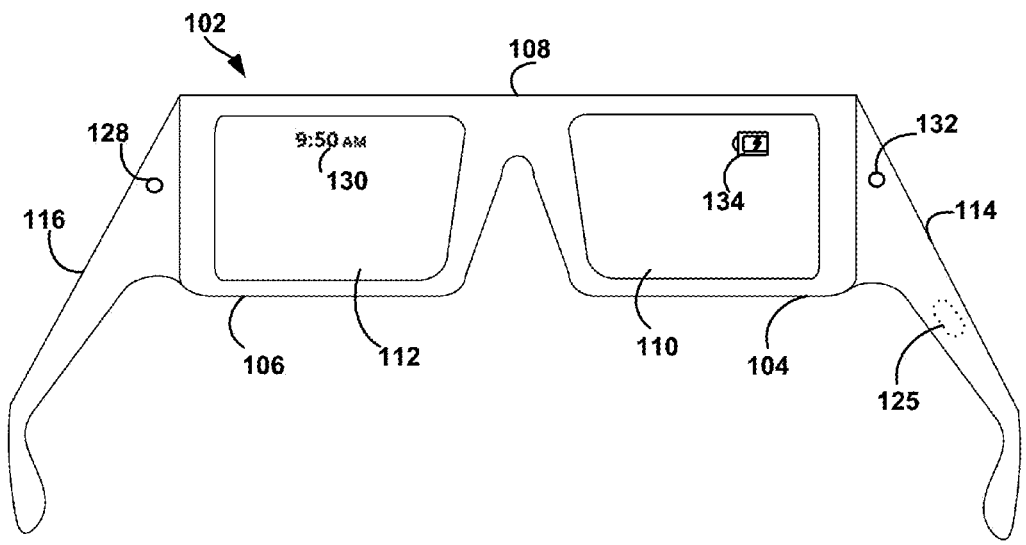
FIG. 1B illustrates an alternate view of the wearable computing device illustrated in FIG. 1A.

FIG. 1B illustrates an alternate view of the wearable computing device illustrated in FIG. 1A. As shown in FIG. 1B, lens elements 110, 112 can act as display elements. HMD 102 can include first projector 128 coupled to an inside surface of extending side-arm 116 and configured to project display 130 onto an inside surface of lens element 112. Additionally or alternatively, a second projector 132 can be coupled to an inside surface of extending side-arm 114 and configured to project display 134 onto an inside surface of lens element 110.

Lens elements 110, 112 can act as a combiner in a light projection system and can include a coating that reflects the light projected onto them from projectors 128, 132. In some embodiments, a reflective coating may not be used (e.g., when projectors 128, 132 are scanning laser devices).

In alternative embodiments, other types of display elements can also be used. For example, lens elements 110, 112 themselves can include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver can be disposed within frame elements 104, 106 for driving such a matrix display. Alternatively or additionally, a laser or LED source and scanning system could be used to draw a raster display directly onto the retina of one or more of the user's eyes. Other possibilities exist as well.

Figure 1C:
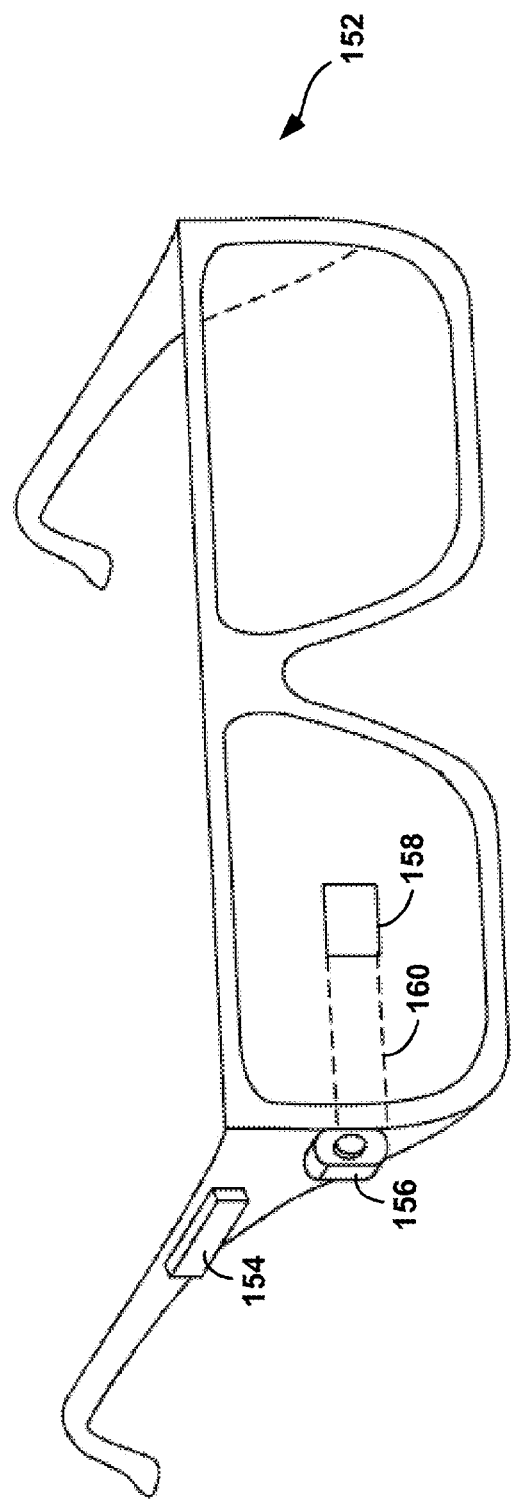
FIG. 1C illustrates another wearable computing device, according to an example embodiment.

FIG. 1C illustrates another wearable computing system which takes the form of an HMD 152. HMD 152 can include frame elements and side-arms such as those described with respect to FIGS. 1A and 1B. HMD 152 can additionally include on-board computing system 154 and image capture device 156, such as those described with respect to FIGS. 1A and 1B. Image capture device 156 is shown mounted on a frame of HMD 152. However, image capture device 156 can be mounted at other positions as well.

As shown in FIG. 1C, HMD 152 can include a single display 158 which can be coupled to the device. Display 158 can be formed on one of the lens elements of HMD 152, such as a lens element described with respect to FIGS. 1A and 1B, and can be configured to overlay computer-generated graphics in the user's view of the physical world. Display 158 is shown to be provided in a center of a lens of HMD 152. However, display 158 can be provided in other positions. For example, display 158 may be located toward either the upper or lower portions of the wearer's field of view. Display 158 may be controllable via computing system 154 that may be coupled to display 158 via optical waveguide 160.

Figure 1D:
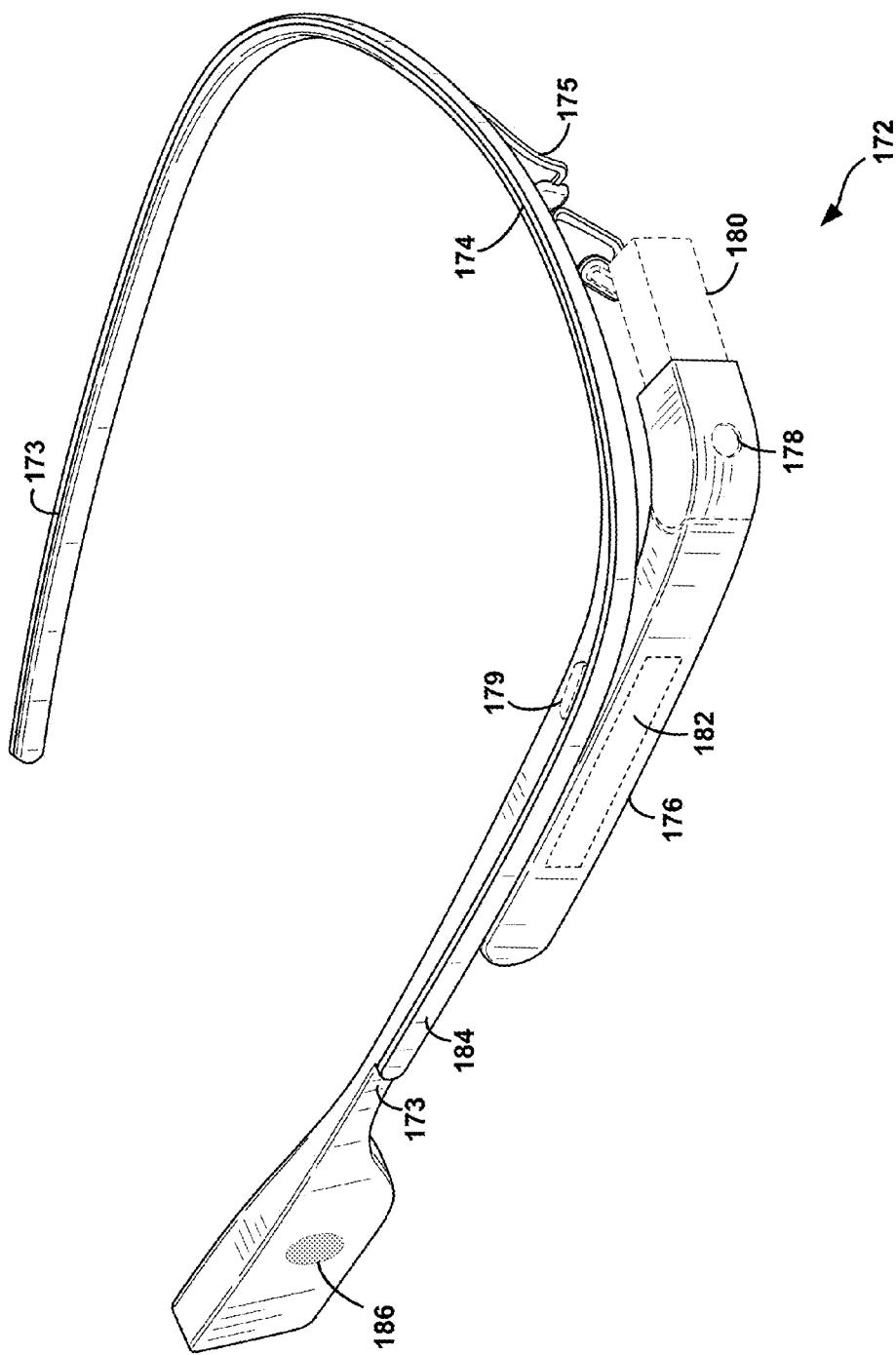
FIG. 1D illustrates yet another wearable computing device, according to an example embodiment.

FIG. 1D illustrates another wearable computing device according to an example embodiment, which takes the form of a monocular HMD 172. HMD 172 can include side-arms 173, a center frame support 174, and a bridge portion with nosepiece 175. In the example shown in FIG. 1D, center frame support 174 connects side-arms 173. HMD 172 does not include lens-frames containing lens elements. HMD 172 can additionally include component housing 176, which can include an on-board computing system (not shown), image capture device 178, and button 179 for operating image capture device 178 (and/or usable for other purposes). Component housing 176 can also include other electrical components and/or can be electrically connected to electrical components at other locations within or on the HMD. HMD 172 also includes a BCT 186.

HMD 172 can include a single display 180, which can be coupled to one of side-arms 173 via component housing 176. In an example embodiment, display 180 can be a see-through display, which is made of glass and/or another transparent or translucent material, such that the wearer can see their environment through display 180. Further, component housing 176 can include the light sources (not shown) for display 180 and/or optical elements (not shown) to direct light from the light sources to display 180. As such, display 180 can include optical features that, when HMD 172 is being worn, direct light generated by these light sources towards the wearer's eye.

In a further aspect, HMD 172 can include a sliding feature 184, which can be used to adjust the length of side-arms 173. Thus, sliding feature 184 can be used to adjust the fit of HMD 172. Further, an HMD can include other features that allow a wearer to adjust the fit of the HMD, without departing from the scope of the embodiments herein.

Figure 1E:
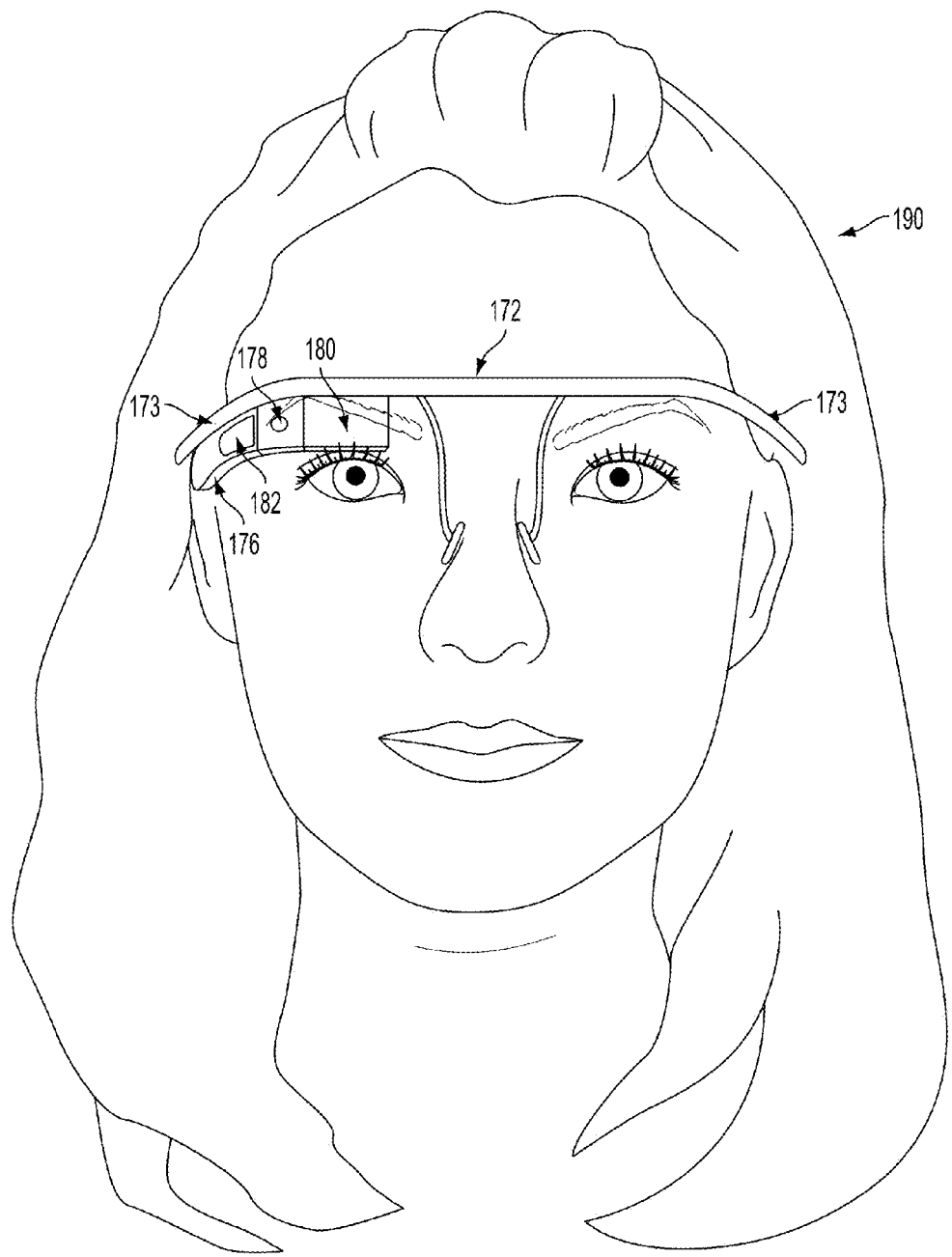
FIGS. 1E, 1F, and 1G are simplified illustrations of the wearable computing device shown in FIG. 1D, being worn by a wearer.
Figure 1F:
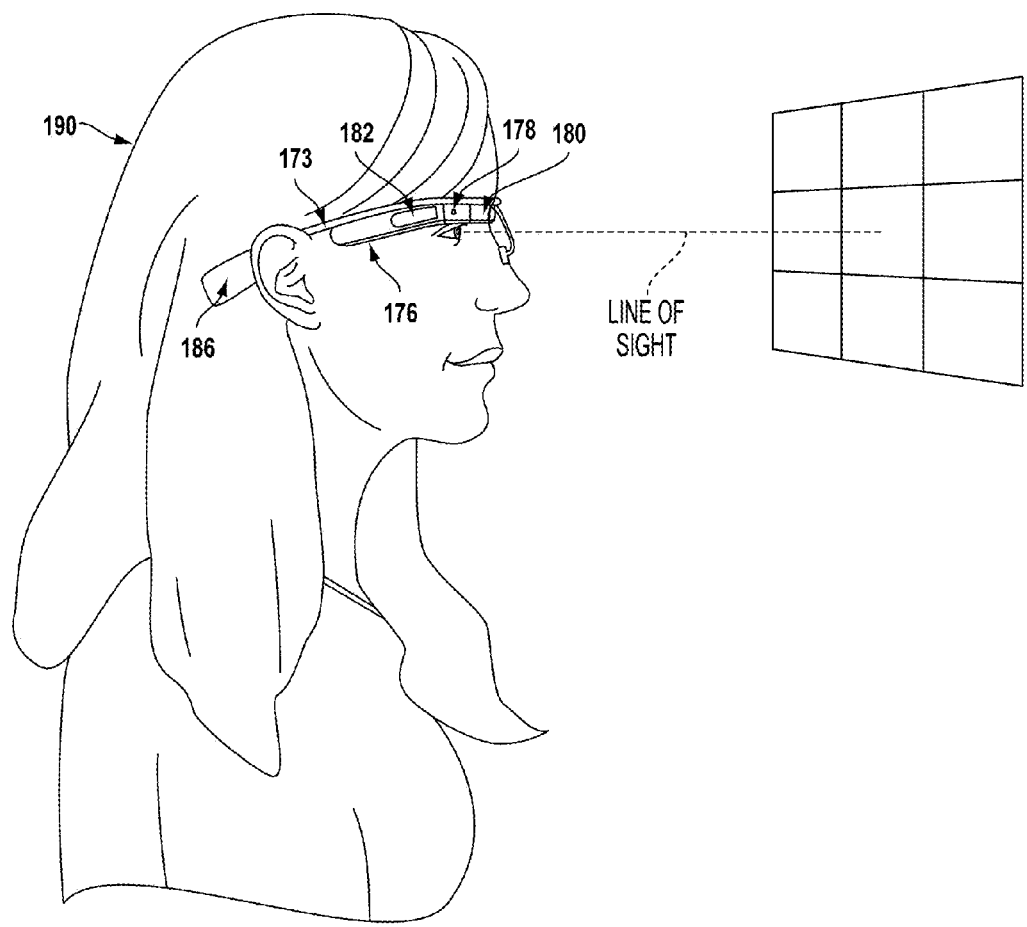
Figure 1G:
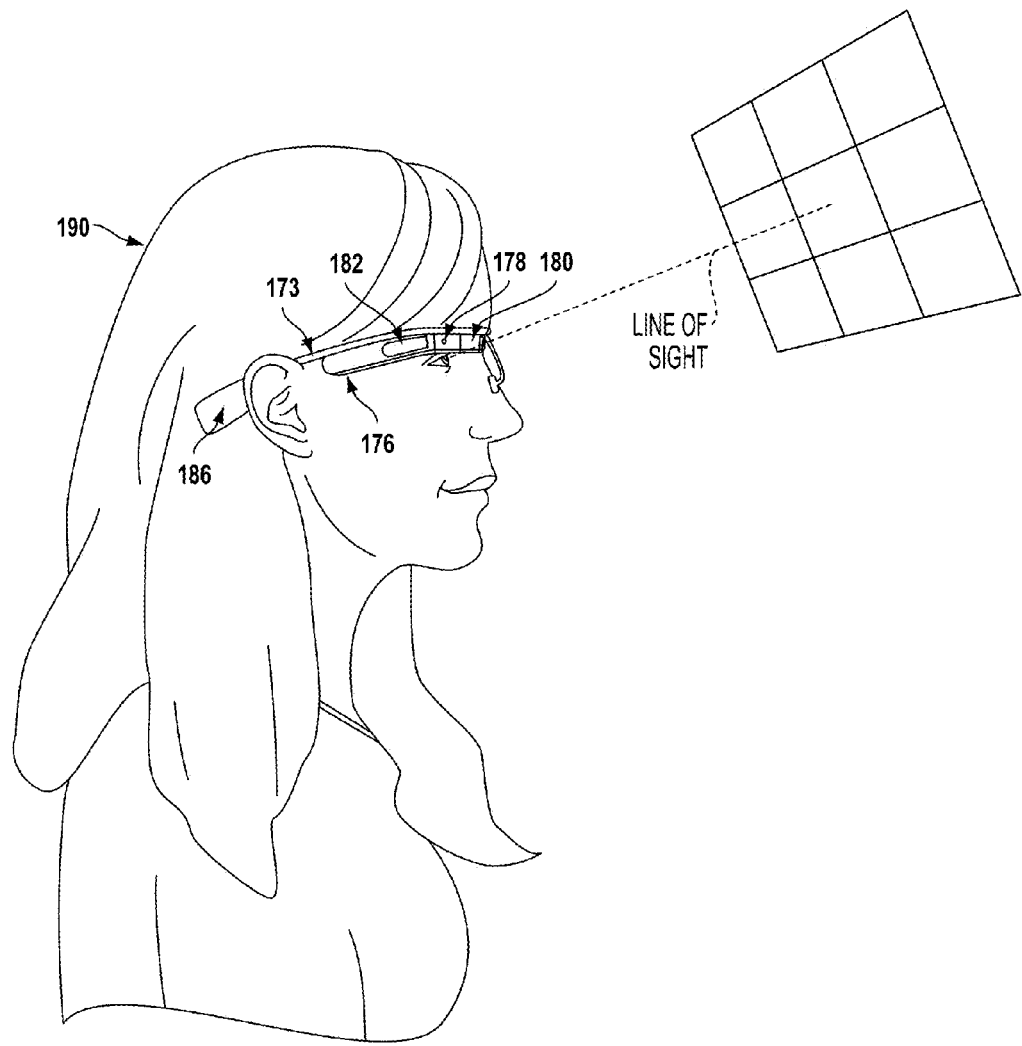

FIGS. 1E, 1F, and 1G are simplified illustrations of HMD 172 shown in FIG. 1D, being worn by a wearer 190. As shown in FIG. 1F, when HMD 172 is worn, BCT 186 is located behind the wearer's ear. As such, BCT 186 is not visible from the perspective shown in FIG. 1E.

In the illustrated example, display 180 can be arranged such that when HMD 172 is worn, display 180 is positioned in front of or proximate to a user's eye. For example, display 180 can be positioned below the center frame support and above the center of the wearer's eye, as shown in FIG. 1E. Further, in the illustrated configuration, display 180 can be offset from the center of the wearer's eye (e.g., so that the center of display 180 is positioned to the right and above of the center of the wearer's eye, from the wearer's perspective).

Configured as shown in FIGS. 1E, 1F, and 1G, display 180 can be located in the periphery of the field of view of wearer 190, when HMD 172 is worn. Thus, as shown by FIG. 1F, when wearer 190 looks forward, wearer 190 can see display 180 with their peripheral vision. As a result, display 180 can be outside the central portion of the wearer's field of view when their eye is facing forward, as it commonly is for many day-to-day activities. Such positioning can facilitate unobstructed eye-to-eye conversations with others, as well as generally providing unobstructed viewing and perception of the world within the central portion of the wearer's field of view. Further, when display 180 is located as shown, wearer 190 can view display 180 by, e.g., looking up with their eyes only (possibly without moving their head). This is illustrated as shown in FIG. 1G, where the wearer has moved her eyes to look up and align her line of sight with display 180. A wearer might also use the display by tilting his or her head down and aligning his or her eye with display 180.

Notably, a wearable computing device, such as those described herein, need not be worn in order to function. For example, the operations described herein, as well as other operations, may be carried out by simply holding the wearable computing device in one's hands or by placing the wearable computing device on a platform such as a desk or a table.

Figure 2A:
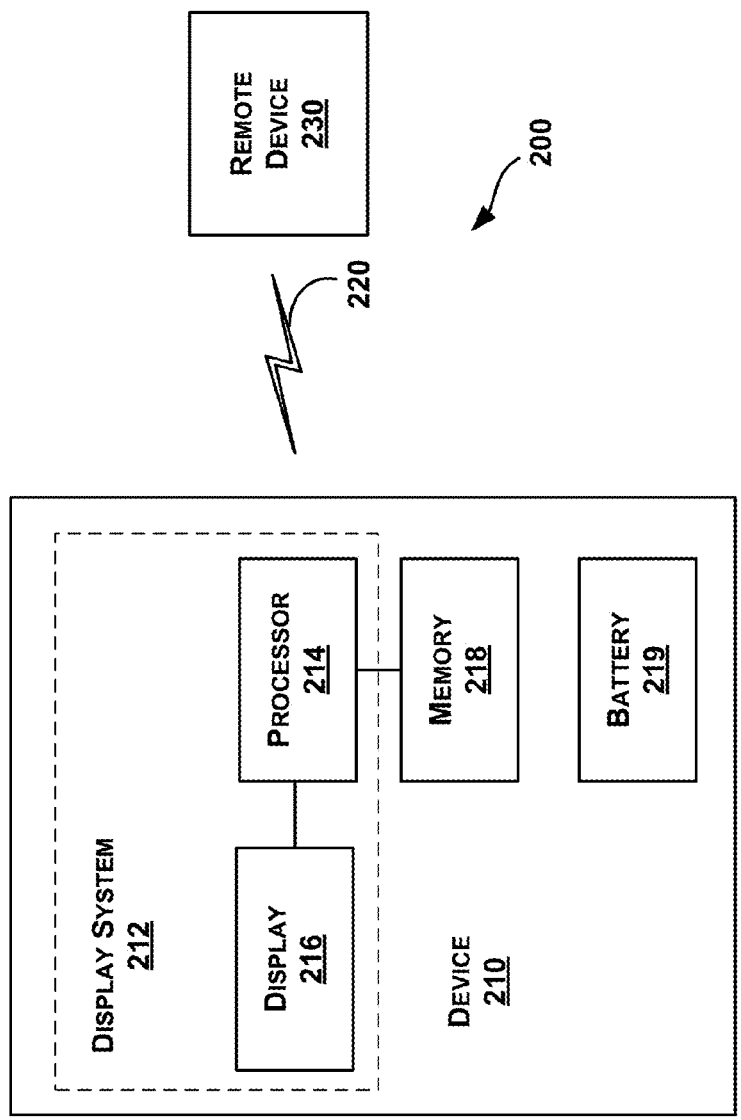
FIG. 2A illustrates a schematic drawing of a computing device, according to an example embodiment.

FIG. 2A illustrates a schematic drawing of computing device 210 (e.g., a wearable computing device) according to an example embodiment. In an example embodiment, device 210 communicates using a communication link 220 (e.g., a wired or wireless connection) to a remote device 230 (e.g., a camera device). Device 210 can be any type of computing device that can receive data and display information corresponding to or associated with the data. For example, device 210 can be a heads-up display system, such as head-mounted devices 102, 152, or 172 described with reference to FIGS. 1A to 1G.

Thus, device 210 can include a display system 212 including a processor 214 and a display 216. Display 216 can be, for example, an optical see-through display, an optical see-around display, or a video see-through display. Processor 214 can receive data from remote device 230, and configure the data for display on display 216. Processor 214 can be any type of processor, such as a micro-processor or a digital signal processor, for example.

Device 210 can further include on-board data storage, such as memory 218 coupled to processor 214. Memory 218 can store software, possibly in the form of program instructions, which can be accessed and executed by processor 214, for example. Memory 218 may also store data that can be manipulated by processor 214, and/or by other components as well.

Device 210 may also include battery 219. Battery 219 may be any type of power source, rechargeable or non-rechargeable, that may provide electrical power to the components of device 210. Thus, battery 219 may be based on one or more of lithium-ion, alkaline, and nickel-cadmium technology, or any other type of battery technology.

Remote device 230 can be any type of computing device or transmitter including a laptop computer, a mobile telephone, camera device, or tablet computing device, etc., that is configured to transmit data to device 210. Remote device 230 and device 210 can contain hardware to enable communication link 220, such as processors, transmitters, receivers, antennas, etc.

In FIG. 2A, communication link 220 is illustrated as a wireless connection; however, wired connections can also be used. For example, communication link 220 can be a wired serial bus such as a universal serial bus or a parallel bus. A wired connection could be a proprietary type of connection as well. Communication link 220 can also be one or more wireless connections using, e.g., BLUETOOTH® radio technology, communication protocols described in IEEE 802.11 (including any IEEE 802.11 revisions), cellular technology (such as GSM, CDMA, UMTS, EV-DO, WiMAX, or LTE), or ZIGBEE® technology, among other possibilities.

3. EXAMPLE IMAGE PROJECTION

Figure 2B:
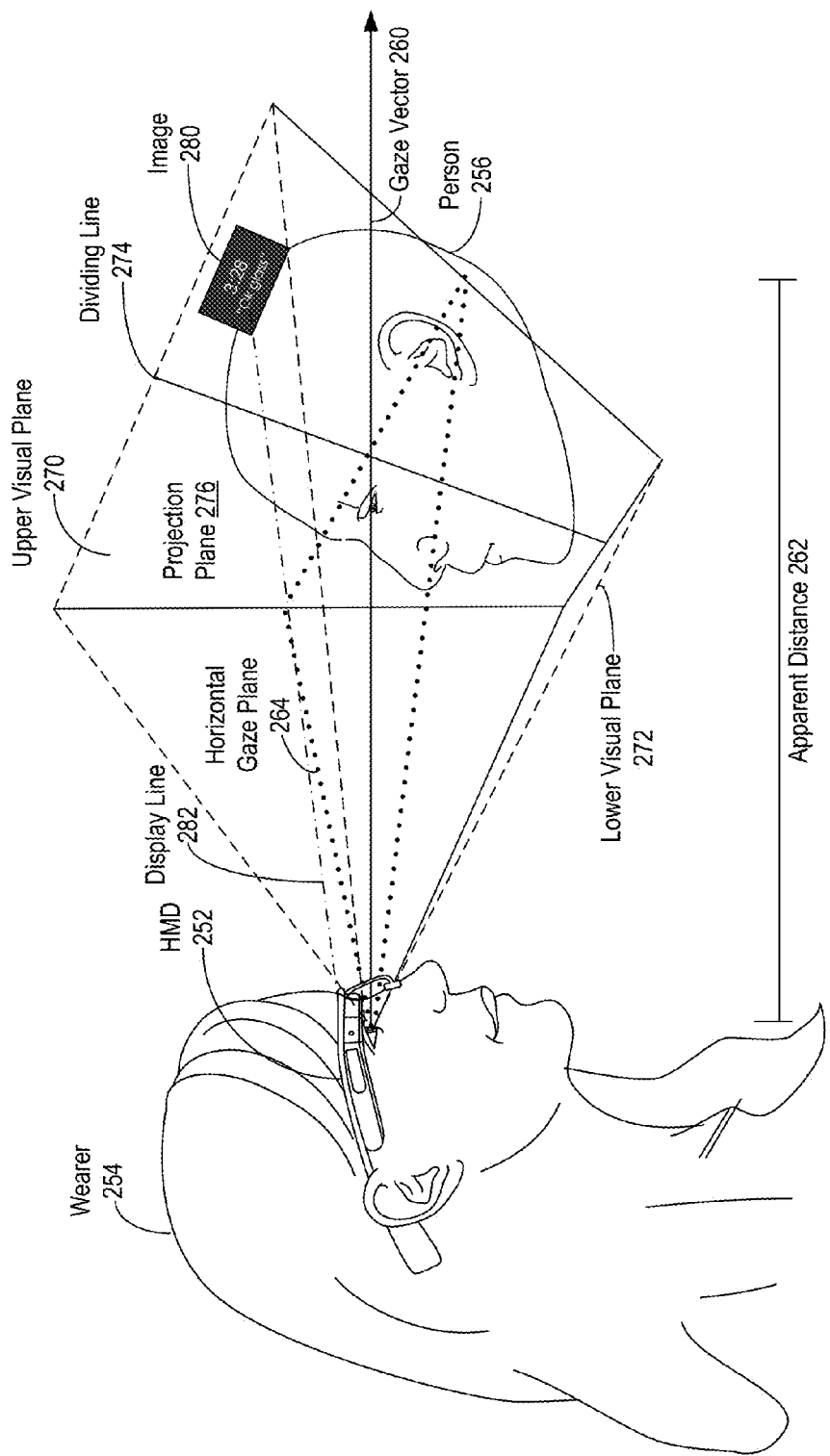
FIG. 2B shows an example projection of an image by an example head-mountable device (HMD), according to an example embodiment.

FIG. 2B shows an example projection of user interface (UI) elements described herein via an image 280 by an example HMD 252, according to an example embodiment. Other configurations of an HMD can also be used to present the UI described herein via image 280. Image 280 may contain a representation of an image captured by a camera device that is wirelessly tethered to HMD 252. For instance, HMD 252 may serve as a remote viewfinder to such a camera device, and may also display still and/or video images captured by the camera device.

FIG. 2B shows wearer 254 of HMD 252 looking at an eye of person 256. As such, wearer 254's gaze, or direction of viewing, is along gaze vector 260. A horizontal plane, such as horizontal gaze plane 264 can then be used to divide space into three portions: space above horizontal gaze plane 264, space in horizontal gaze plane 264, and space below horizontal gaze plane 264. In the context of projection plane 276, horizontal gaze plane 260 appears as a line that divides projection plane into a subplane above the line of horizontal gaze plane 260, a subplane below the line of horizontal gaze plane 260, and the line where horizontal gaze plane 260 intersects projection plane 276. In FIG. 2B, horizontal gaze plane 264 is shown using dotted lines.

Additionally, a dividing plane, indicated using dividing line 274 can be drawn to separate space into three other portions: space to the left of the dividing plane, space on the dividing plane, and space to right of the dividing plane. In the context of projection plane 276, the dividing plane intersects projection plane 276 at dividing line 274. Thus, the dividing plane divides projection plane 276 into a subplane to the left of dividing line 274, a subplane to the right of dividing line 274, and dividing line 274. In FIG. 2B, dividing line 274 is shown as a solid line.

Humans, such as wearer 254, when gazing in a gaze direction, can have limits on what objects can be seen above and below the gaze direction. FIG. 2B shows upper visual plane 270 as the uppermost plane that wearer 254 can see while gazing along gaze vector 260, and shows lower visual plane 272 as the lowermost plane that wearer 254 can see while gazing along gaze vector 260. In FIG. 2B, upper visual plane 270 and lower visual plane 272 are shown using dashed lines.

HMD 252 can project an image for view by wearer 254 at some apparent distance 262 along display line 282, which is shown as a dotted and dashed line in FIG. 2B. For example, apparent distance 262 can be 1 meter, four feet, infinity, or some other distance. That is, HMD 252 can generate a display, such as image 280, which appears to be at the apparent distance 262 from the eye of wearer 254 and in projection plane 276. In this example, image 280 is shown between horizontal gaze plane 264 and upper visual plane 270; that is image 280 is projected above gaze vector 260. In this example, image 280 is also projected to the right of dividing line 274. As image 280 is projected above and to the right of gaze vector 260, wearer 254 can look at person 256 without image 280 obscuring their general view. In one example, the display element of HMD 252 is translucent when not active (i.e. when image 280 is not being displayed), and so wearer 254 can perceive objects in the real world along the vector of display line 282.

Other example locations for displaying image 280 can be used to permit wearer 254 to look along gaze vector 260 without obscuring the view of objects along gaze vector 260.

For example, in some embodiments, image 280 can be projected above horizontal gaze plane 264 near and/or just above upper visual plane 270 to keep image 280 from obscuring most of wearer 254's view. Then, when wearer 254 wants to view image 280, wearer 254 can move his or her eyes such that his or her gaze is directly toward image 280.

4. EXAMPLE CAMERA DEVICE

Figure 3:
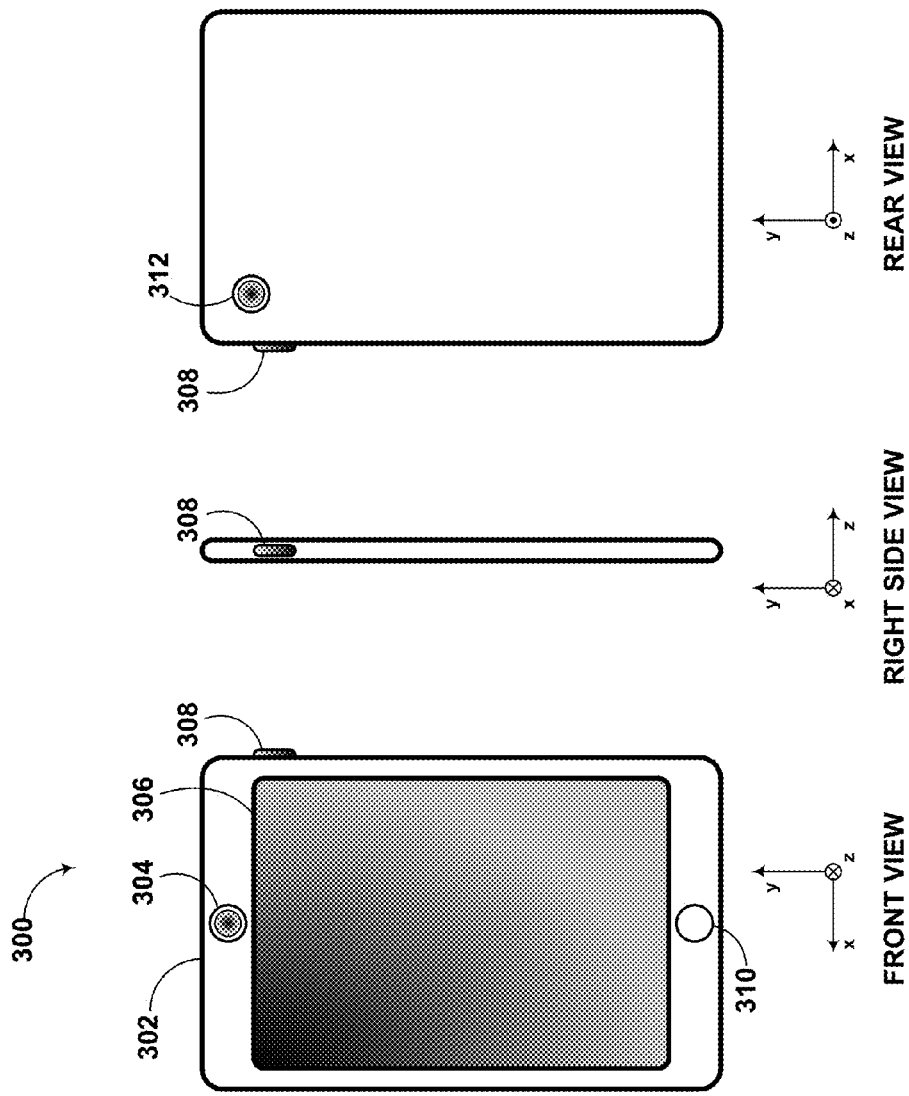
FIG. 3 shows an example camera device, according to an example embodiment.

FIG. 3 illustrates an example form factor and features of camera device 300. Camera device 300 may be, for example, a standalone digital camera, a mobile phone, a tablet computer, or any computing device with communication capabilities. Camera device 300 may be wirelessly tethered to another device, such as a wearable computing device (e.g., HMD 252) such that this other device has some degree of remote control over the operation of camera device 300. As one possible example, HMD 252 may be wirelessly tethered to camera device 300, and via this arrangement may be able to instruct camera device 300 to capture still images and/or video. HMD 252 may display these captured images such that the wearer of HMD 252 can view them as part, or all, of displayed UI of HMD 252.

Camera device 300 may include various elements, such as body 302, front-facing camera 304, multi-element display 306, shutter button 308, and other buttons 310. Camera device 300 could further include rear-facing camera 312. Front-facing camera 304 may be positioned on a side of body 302 typically facing a user while in operation, or on the same side as multi-element display 306. Rear-facing camera 312 may be positioned on a side of body 302 opposite front-facing camera 304. Referring to the cameras as front and rear facing is arbitrary, and camera device 300 may include multiple cameras positioned on various sides of body 302. HMD 252 may be able to control one or more of these individual cameras.

Multi-element display 306 could represent a cathode ray tube (CRT) display, a light emitting diode (LED) display, a liquid crystal (LCD) display, a plasma display, a MEMS-based display, or any other type of display known in the art. In some embodiments, multi-element display 306 may display a digital representation of the current image being captured by front-facing camera 304 and/or rear-facing camera 312, or an image that could be captured or was recently captured by either or both of these cameras. Thus, multi-element display 306 may serve as a viewfinder for either camera. Multi-element display 306 may also support touchscreen and/or presence-sensitive functions that may be able to adjust the settings and/or configuration of any aspect of camera device 300. Some embodiments of camera device 300 may not have the multi-element display at all, relying on an HMD for display of captured image to a user.

Front-facing camera 304 may include an image sensor and associated optical elements such as lenses. Front-facing camera 304 may offer zoom capabilities or could have a fixed focal length. In other embodiments, interchangeable lenses could be used with front-facing camera 304. Front-facing camera 304 may have a variable mechanical aperture and a mechanical and/or electronic shutter. Front-facing camera 304 also could be configured to capture still images, video images, or both. Further, front-facing camera 304 could represent a monoscopic, stereoscopic, or multiscopic camera. Rear-facing camera 312 may be similarly or differently arranged. Additionally, front-facing camera 304, rear-facing camera 312, or both, may be an array of one or more cameras.

Some of these cameras may have imaging capabilities different from other cameras in the device 300 (e.g., different sensitivity and/or different spectral response).

Either or both of front facing camera 304 and rear-facing camera 312 may include or be associated with an illumination component that provides a light field to illuminate a target object. For instance, an illumination component could provide flash or constant illumination of the target object. An illumination component could also be configured to provide a light field that includes one or more of structured light, polarized light, and light with specific spectral content. Other types of light fields known and used to recover three-dimensional (3D) models from an object are possible within the context of the embodiments herein.

Either or both of front facing camera 304 and rear-facing camera 312 may include or be associated with an ambient light sensor that may continuously or from time to time determine the ambient brightness of a scene that the camera can capture. In some devices, the ambient light sensor can be used to adjust the display brightness of a screen associated with the camera (e.g., a viewfinder). When the determined ambient brightness is high, the brightness level of the screen may be increased to make the screen easier to view. When the determined ambient brightness is low, the brightness level of the screen may be decreased, also to make the screen easier to view as well as to potentially save power.

Camera device 300 could be configured to use multi-element display 306, and either front-facing camera 304 or rear-facing camera 312, to capture images of a target object. The captured images could be one or more still images or a video stream. The image capture could be triggered by activating shutter button 308, pressing a softkey on multi-element display 306, by voice command, by remote control from a wirelessly tethered device, or by some other mechanism. Depending upon the implementation, the images could be captured automatically at a specific time interval, upon pressing shutter button 308, upon appropriate lighting conditions of the target object, upon moving camera device 300 a predetermined distance, or according to a predetermined capture schedule.

In order to support processing and communication functions, camera device 300 may include may include a processor, data storage, and one or more communication interfaces (not shown). The processor may comprise one or more general purpose processors and/or one or more special purpose processors. The data storage may include one or more volatile and/or non-volatile storage components, such as magnetic, optical, flash, or organic storage, and may be integrated in whole or in part with the processor. The processor may be capable of executing program instructions stored in data storage to carry out various camera device functions. The execution of these program instructions by the processor may result in the processor using data, which may also be stored in the data storage. The communication interface may function to allow camera device 300 to communicate, using analog or digital modulation, with other devices and/or networks.

5. WIRELESS TETHERING

Figure 4:
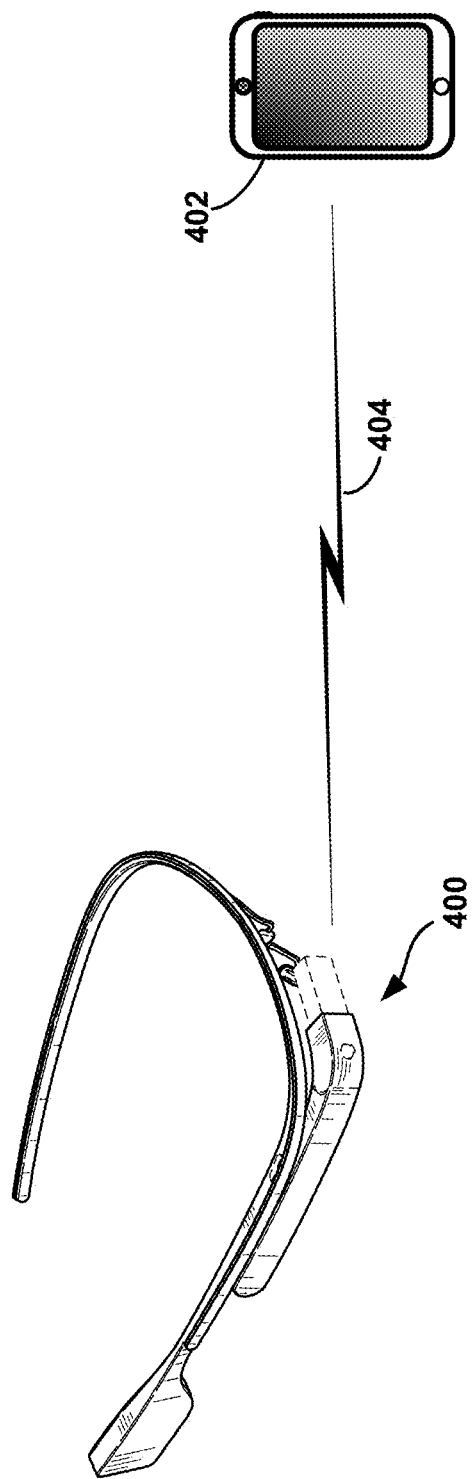
FIG. 4 shows an example wearable computing device in communication with an example camera device, according to an example embodiment.

FIG. 4 illustrates an example of wireless tethering between wearable computing device 400 and camera device 402. Although wearable computing device 400 takes on the appearance of monocular HMD 172 and camera device 402 takes on the appearance of camera device 300, FIG. 4 is just a representative illustration. Thus, wearable computing device 400 and camera device 402 may take on different appearances and form factors.

In FIG. 4, wearable computing device 400 and camera device 402 communicate with one another via wireless link 404. Wireless link 404 may be any type of wireless communication medium, for instance, Wifi and/or BLUETOOTH®. In some cases, wireless link 404 may include two or more distinct wireless channels communicatively coupling wearable computing device 400 and camera device 402. For instance, wireless link 404 may include a Wifi link and a BLUETOOTH® link.

Camera device 402 may be tethered to wearable computing device 400 via wireless link 404. This tethering may involve, for example, link layer pairing or bonding similar to that of BLUETOOTH®, or an association between the devices being formed at a higher layer, such as at the application layer. Regardless of how tethering is accomplished, wearable computing device 400 and camera device 402 may be configured to wirelessly communicate with one another.

Communication between these devices may be carried out using one or more communication protocols over one or more physical or logical communication channels. For instance, wireless link 404 may include a control channel and a data channel. Wearable computing device 400 and camera device 402 may exchange signaling messages over the control channel. Among other possible functions, these signaling messages may serve to schedule, set up, or otherwise establish data communications over the data channel. For instance, if the devices both support Wifi and BLUETOOTH®, the BLUETOOTH® interface may be used as the control channel and the Wifi interface may be used as the data channel. On the other hand, in some embodiments the data channel may be used to transport signaling messages.

One of the advantages of the arrangement of FIG. 4 is that wearable computing device 400 may be able to remotely control camera device 402. For instance, camera device 402 may be mounted on a tripod for purposes of stability. When the shutter of camera device 402 is open, camera device 402 may capture a stream of images and transmit these images to wearable computing device 400. Thus, wearable computing device 400 may receive and display these images, acting as a remote viewfinder for camera device 402. The wearer of wearable computing device may then signal wearable computing device 400, e.g., with touches or verbal commands, to send instructions to camera device 402. For instance, the wearer may speak the verbal commands "zoom in," "zoom out," "pan left," "pan right," and/or "capture." These commands may be transcribed by wearable computing device 400 into instructions that wearable computing device transmits to camera device 402, and camera device 402 may carry out the associated functions.

Figure 5:
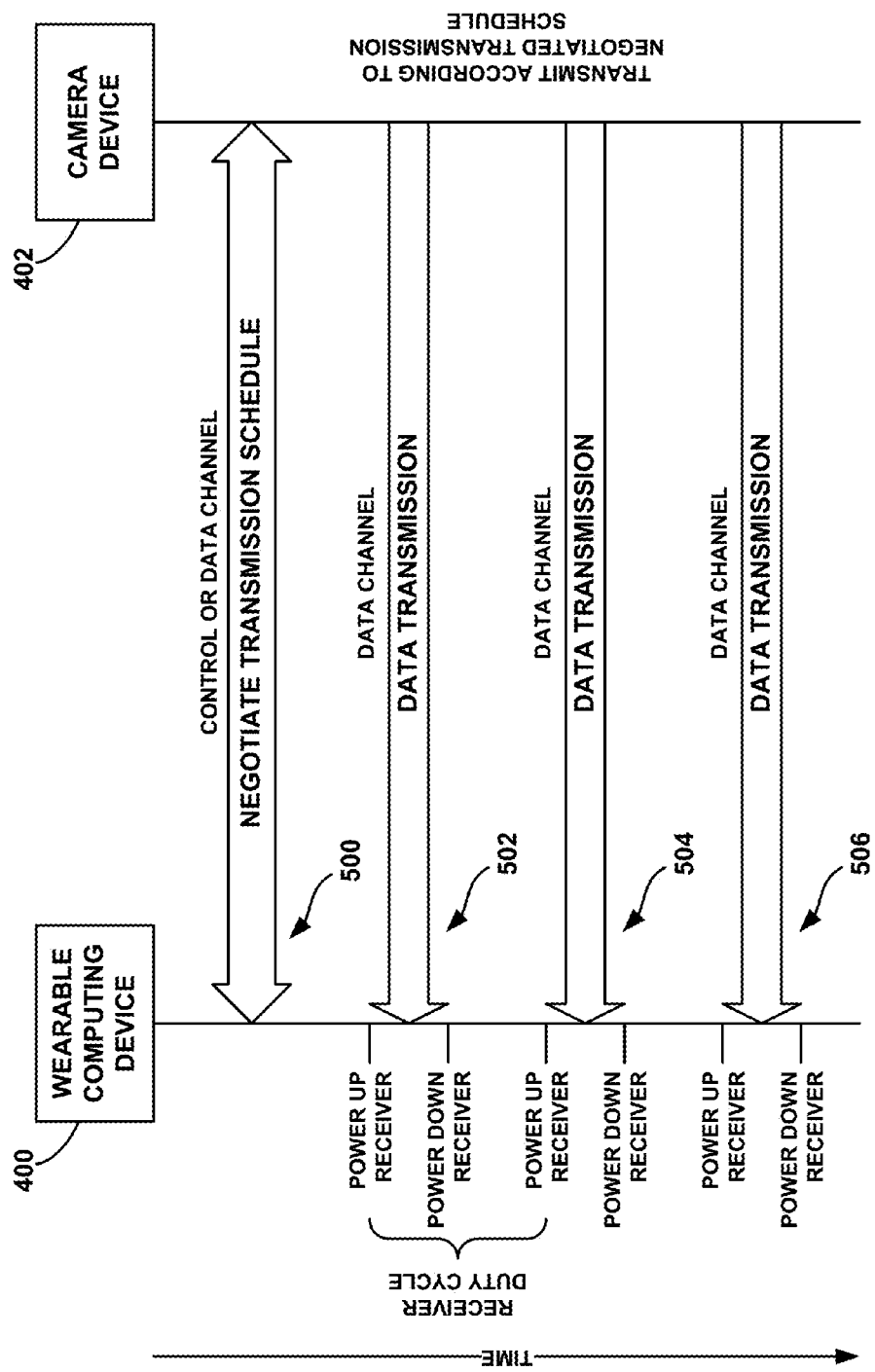
FIG. 5 is a message flow, according to an example embodiment.
Figure 6:
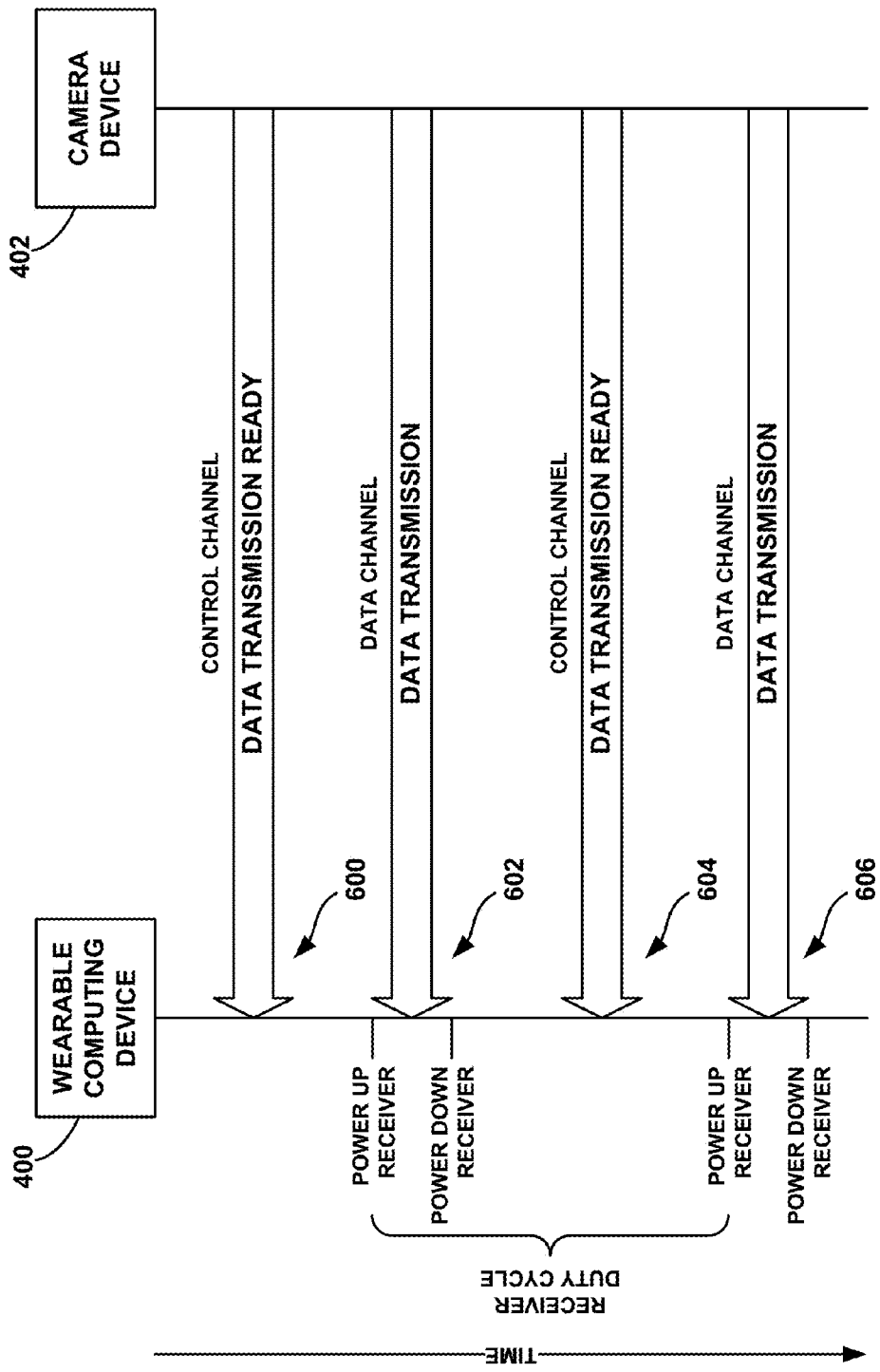
FIG. 6 is another message flow, according to an example embodiment.
Figure 7:
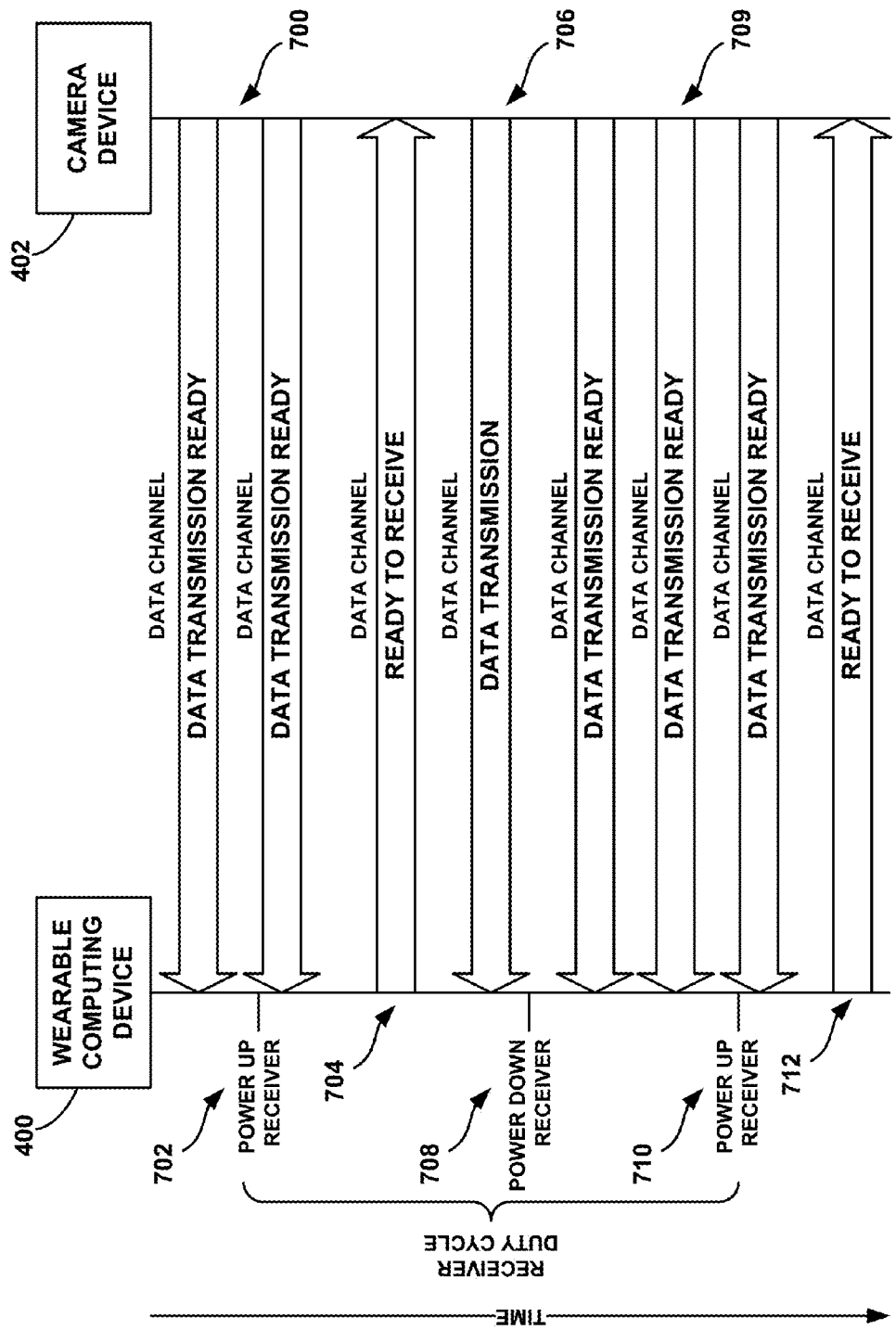
FIG. 7 is yet another message flow, according to an example embodiment.

FIGS. 5-7 illustrate signaling and data transmissions between camera device 402 to any wearable computing device 400. In particular, the data transmissions can be arranged so that, among other possible advantages, a data receiver of wearable computing device 400 can be powered down from time to time. This powering down, in turn, may conserve the battery power and/or battery life of wearable computing device 400. Although FIGS. 5-7 use wearable computing device 400 and camera device 402 as example devices, the message flows illustrated by these figures could take place between different types of devices.

Additionally, the terms "powering down," "power down," "powered down," as well as any similar terms, refer changing the state of a data receiver (or transmitter) from a higher-power state to a lower-power state. Similarly, the "powering up," "power up," "powered up," as well as any similar terms, refer changing the state of a data receiver (or transmitter) from a lower-power state to a higher-power state. As an example, the data receiver may be supplied with a higher voltage when in a higher-power state than when the data receiver is in a lower-power state. Further, the lower-power state may be a state in which the data receiver operates on a reduced power budget, or is completely shut off.

FIG. 5 is a message flow illustrating an example embodiment. At block 500, wearable computing device 400 and camera device 402 may negotiate a transmission schedule. This negotiation may take place over a data channel and/or a control channel. The transmission schedule may include the exact, relative, or approximate times of one or more data transmissions from camera device 402 to wearable computing device 400. Once it is agreed upon, camera device 402 may transmit data according to the negotiated transmission schedule, and wearable computing device 400 may receive the transmitted data according to this schedule.

For example, at block 502, camera device 402 may transmit a scheduled data transmission, over a data channel, to wearable computing device 400. Prior to receiving the data transmission, wearable computing device 400 may power up its data receiver, and after receiving the data transmission, wearable computing device 400 may power down its data receiver.

In some cases, wearable computing device 400 may seek to maintain its data receiver in the powered up state for the shortest possible period of time in order to receive the data transmission. In other scenarios, wearable computing device 400 may begin powering up its data receiver prior to the scheduled beginning of the data transmission in an attempt to ensure that the data receiver is fully powered up when the data transmission arrives at wearable computing device 400. Further, wearable computing device 400 may wait a period of time (e.g., a "hang time") after the data transmission completes before beginning to power down the data receiver.

At block 504, camera device 402 may transmit another scheduled data transmission, over the data channel, to wearable computing device 400. At block 506, camera device 402 may transmit still another scheduled data transmission, over the data channel, to wearable computing device 400. Between each of data transmissions 502, 504, and 506, wearable computing device 400 may power down its data receiver. This potentially results in a data receiver duty cycle that is roughly defined by the time period between two sequential power ups of the data receiver. The data receiver is powered up for a portion of this duty cycle, and is powered down for the remainder of the duty cycle. In this way, power is conserved at wearable computing device 400. A similar power up and power down cycle may happen at the transmitter, possibly based on the data transfer rate.

FIG. 6 is a message flow illustrating another example embodiment. At block 600, camera device 402 may transmit a "data transmission ready" message to wearable computing device 400. This message may indicate to wearable computing device 400 that camera device 402 is ready to transmit a data transmission to wearable computing device 400. This message may be transmitted over a control channel to wearable computing device 400, and wearable computing device 400 may receive the message with its control receiver.

Consequently, at block 602, wearable computing device 400 may power up its data receiver, receive the data transmission, and then power down its data receiver. As was the case for the embodiment illustrated by FIG. 5, the data receiver may be powered up some period of time prior to receiving the data transmission, and/or may be powered down some period of time after receiving the data transmission.

At block 604, camera device 402 transmits another "data transmission ready" message to wearable computing device 400. At block 606, wearable computing device 400 may again power up its data receiver, receive the associated data transmission, and then power down its data receiver.

In this case, the data receiver duty cycle is from the time wearable computing device 400 powers up the data receiver during block 602 to the time wearable computing device 400 powers up the data receiver during block 606. The data receiver is powered up for a portion of this duty cycle, and is powered down for the remainder of the duty cycle. Thus, power may be conserved at wearable computing device 400.

FIG. 7 is a message flow illustrating still another example embodiment. At block 700, camera device 402 may transmit a series of "data transmission ready" messages to wearable computing device 400 via a data channel. Wearable computing device 400 may be arranged to periodically, or from time to time, power up its data receiver in order to determine whether camera device 402 has a data transmission ready to transmit.

At block 702, wearable computing device 400 may power up its data receiver, and receive one of the data transmission ready messages. Consequently, at block 704, wearable computing device 400 may transmit a "ready to receive" message to camera device 402. Possibly in response to receiving this message, at block 706, camera device 402 may transmit a data transmission to wearable computing device 400. After receiving this data transmission with its data receiver, at block 708, wearable computing device 400 may power down its data receiver.

In some embodiments, the data transmission may contain an indication of when a subsequent data transmission will be transmitted. Therefore, wearable computing device 400 may be able to power down its data receiver until approximately that time, and then power on its data receiver to receive the subsequent data transmission.

At block 709, camera device 402 may transmit, via the data channel, another series of "data transmission ready" messages to wearable computing device 400. At block 710, wearable computing device 400 may power up its data receiver and receive one or more of these data transmission ready messages. Consequently, at block 712, wearable computing device 400 may transmit a "ready to receive" message to camera device 402. Subsequently, camera device 402 may transmit a data transmission to wearable computing device 400, and after receiving this data transmission with its data receiver, wearable computing device 400 may power down its data receiver (not shown).

If wearable computing device 400 powers up its data receiver but does not receive a data transmission ready message, wearable computing device 400 may infer that there is no data to receive, and may responsively power down its data receiver for a period of time. In the example embodiment of FIG. 7, the duty cycle for the data receiver of wearable computing device 400 is from block 702 to block 710. The data receiver is powered up for a portion of this duty cycle, and is powered down for the remainder of the duty cycle. In this way, power may be conserved at wearable computing device 400.

FIGS. 5-7 are illustrations of non-limiting embodiments. Other arrangements and/or ordering of messages may accomplish the same or similar goals as the illustrated embodiments. Also, devices that operate according to these embodiments may employ two or more of these embodiments, either sequentially or at the same time.

Figure 8:
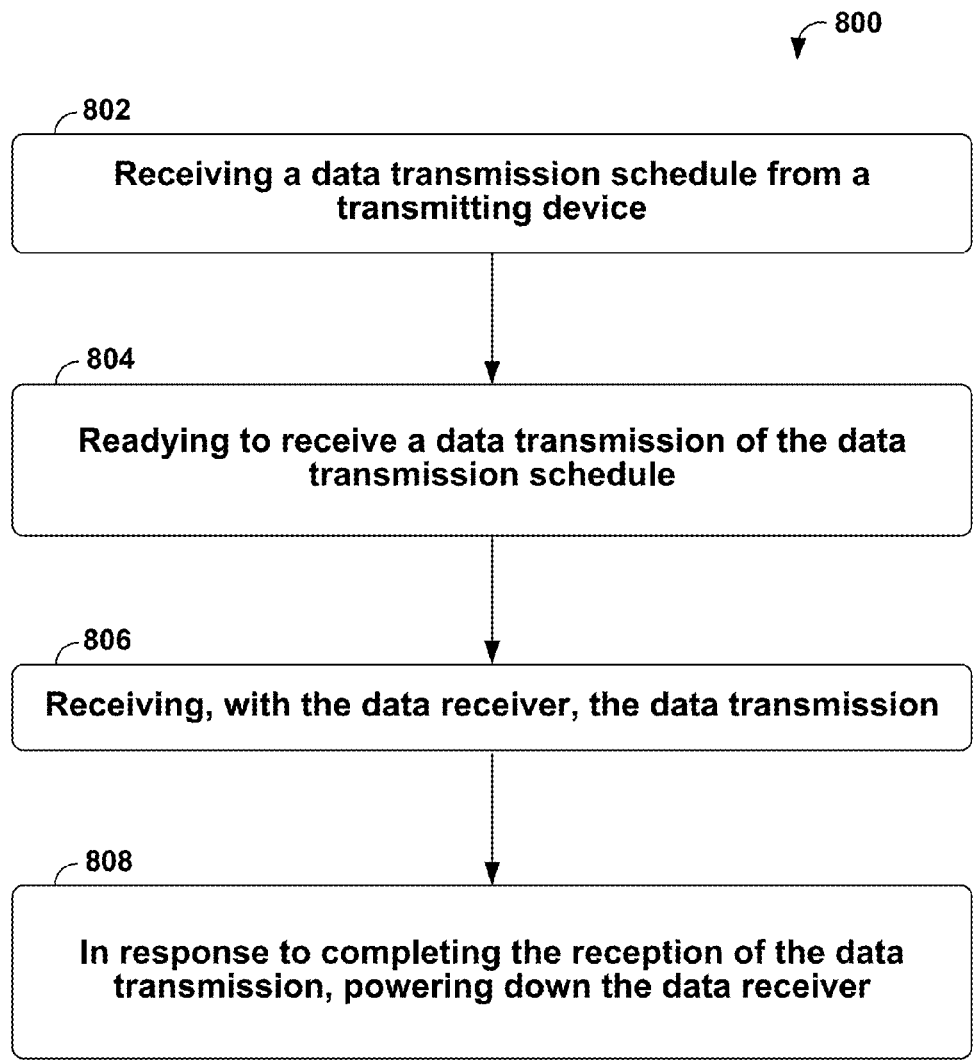
FIG. 8 is a flow chart, according to an example embodiment.

FIG. 8 is a flow chart illustrating a method, according to an example embodiment. In FIG. 8, method 800 may be carried out by a computing device with a data receiver. In general, method 800 can be carried out by any type of computing device and any type of data receiver. In some embodiments, the computing device may be a wearable computing device, and the transmitting device may be a camera device wirelessly tethered to the wearable computing device. However, in other embodiments, the computing device and the transmitting device may take other forms.

At block 802 of method 800, the computing device may receive a data transmission schedule from a transmitting device. The data transmission schedule may include indications of when future transmissions from the transmitting device to the computing device may take place.

At block 804, the computing device may be readied to receive one or more data transmissions of the data transmission schedule. This may involve, for instance powering up the data receiver of the computing device.

At block 806, the data receiver may receive the one or more data transmissions from the transmitting device. At block 808, possibly in response to completing reception of the data transmissions, the data receiver may be powered down.

Figure 9:
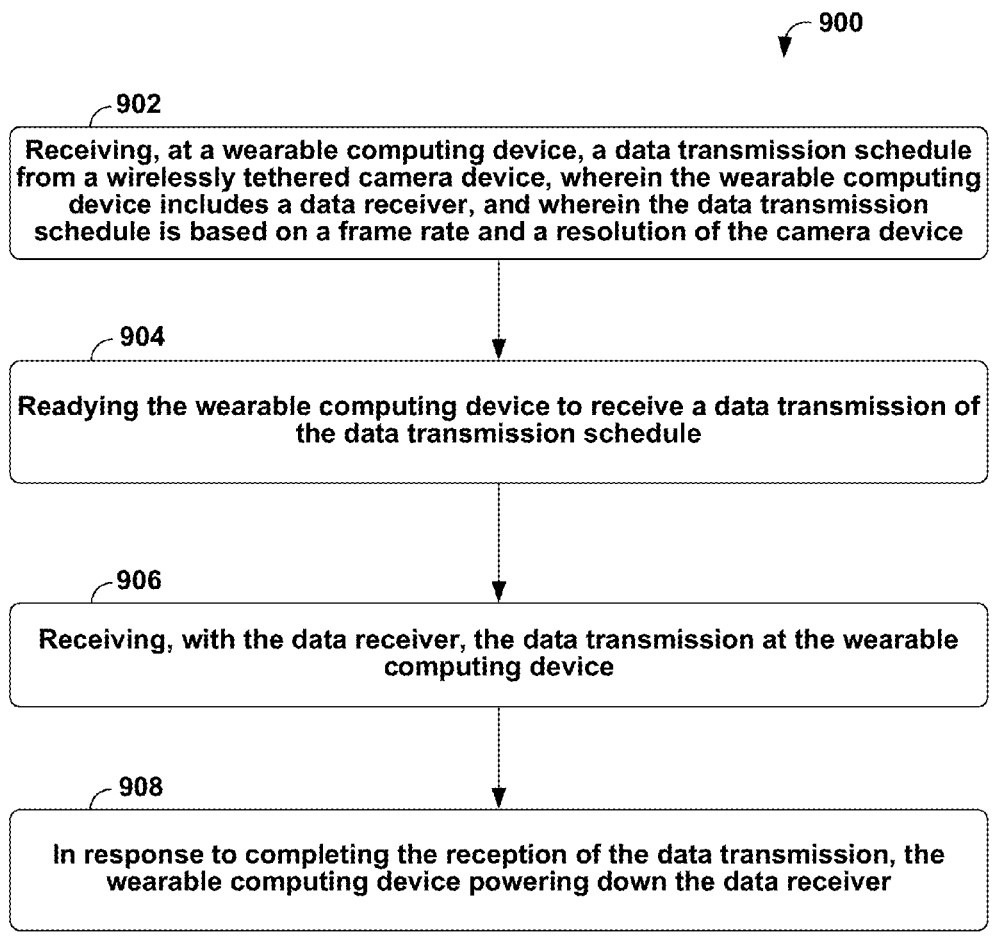
FIG. 9 is another flow chart, according to an example embodiment.

FIG. 9 is a flow chart illustrating another method, according to a further example embodiment. In FIG. 9, method 900 may be carried out by a wearable computing device with a data receiver. However, method 900 can be carried out by devices other than a wearable computing device, and/or can be carried out by sub-systems in a wearable computing device, or in other devices. For example, method 900 can be carried out by a device, such as a mobile phone, which is programmed to simultaneously display an object on a screen or other graphical display, and to also receive a video stream from a remote camera device.

At block 902 of method 900, a wearable computing device may receive a data transmission schedule from a wirelessly tethered camera device. The wearable computing device may include a data receiver, and the data transmission schedule may be based on a frame rate and a resolution of the camera device. The wearable computing device may display images captured by and received from the camera device.

If the wearable computing device receives the data transmission schedule using the data receiver, the data receiver may remain powered up to receive the scheduled data transmissions. However, the data receiver could be in a powered down state when the wearable computing device receives the data transmission schedule (e.g., the wearable computing device may have received the data transmission schedule via a control receiver). In this case, readying the wearable computing device to receive the data transmission may involve the wearable computing device powering up the data receiver. Alternatively or additionally, data transmission schedule may include a sequence of one or more upcoming data transmissions from the camera device to the wearable computing device. Thus, readying the wearable computing device to receive the data transmission may involve powering up the data receiver, according to the schedule, to receive the data transmission.

In some embodiments, the data transmission schedule may be based on data queued, at the camera device, for transmission to the wearable computing device, as well as a data channel capacity between the camera device and the wearable computing device. For instance, if there are 3 megabytes (24 megabits) of data queued at the camera device, and there is an 8 megabit per second channel between the camera device and the wearable computing device, a 3 second data transmission may be scheduled. This data transmission may take place continuously, or may be divided into several distinct data transmissions. In some cases, there may be enough time between subsequent data transmissions for the wearable computing device to power off its data receiver, thereby conserving power.

Regardless, a scheduled data transmission may take a longer or shorter amount of time than scheduled due to fluctuating data channel conditions as well as the extent of other types of network traffic sharing the data channel. Further, the data channel capacity may be estimated based on a formula and/or past data channel performance, and this estimated data channel capacity may be different from the actual data channel capacity at the time that the data is transmitted. Thus, based on the actual duration of a particular data transmission, subsequent data transmissions scheduled for a particular time may be rescheduled to take place sooner or later.

At block 904, the wearable computing device may be readied to receive, from the camera device, a data transmission of the data transmission schedule. At block 906, the wearable computing device may receive, with the data receiver, the data transmission.

At block 908, possibly in response to completing the reception of the data transmission, the wearable computing device may power down the data receiver. Completing the reception of the data transmission may involve the wearable computing device receiving an indication, from the camera device, of when a subsequent data transmission of the data transmission schedule is scheduled to take place. Further, the wearable computing device may also include a data transmitter that remains powered up when the data receiver is powered down.

In some embodiments, the wearable computing device may include a control receiver configured to receive information from a control channel. Thus, the wearable computing device may receive the data transmission schedule via the control channel, and the wearable computing device may receive data transmissions via a data channel. Further, the wearable computing device may maintain the control receiver in a powered-on state while the wearable computing device (i) powers the data receiver up to receive data transmissions of the data transmission schedule, and/or (ii) powers the data receiver down when data transmissions of the data transmission schedule are not being received.

In additional embodiments, receiving the data transmission schedule involves powering up the data receiver and receiving the data transmission schedule with the data receiver. Readying the wearable computing device to receive the data transmission may involve the wearable computing device transmitting, to the camera device, an indication that the wearable computing device is ready to receive the data transmission.

6. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including substantially concurrent or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

We claim:

1. A method comprising:
   receiving, at a wearable computing device, a data transmission schedule from a wirelessly tethered camera device, wherein the wearable computing device includes a data receiver, and wherein the data transmission schedule is based on a frame rate and a resolution of the camera device;
   readying the wearable computing device to receive a data transmission of the data transmission schedule;
   receiving, with the data receiver, the data transmission at the wearable computing device; and
   in response to completing the reception of the data transmission, the wearable computing device powering down the data receiver, wherein the wearable computing device includes a display mechanism configured to display a representation of the received data transmission.

2. The method of claim 1, wherein the data receiver is in a powered down state when the wearable computing device receives the data transmission schedule, and wherein readying the wearable computing device to receive the data transmission comprises the wearable computing device powering up the data receiver.

3. The method of claim 1, wherein the data transmission schedule comprises a sequence of one or more upcoming data transmissions from the camera device to the wearable computing device, and wherein readying the wearable computing device to receive the data transmission comprises powering up the data receiver according to the schedule to receive the data transmission.

4. The method of claim 3, wherein the data transmission schedule is based on data queued, at the camera device, for transmission to the wearable computing device, and a data channel capacity between the camera device and the wearable computing device.

5. The method of claim 1, wherein the wearable computing device also comprises a data transmitter, and wherein the data transmitter remains powered up when the data receiver is powered down.

6. The method of claim 1, wherein completing the reception of the data transmission comprises the wearable computing device receiving an indication, from the camera device, of when a subsequent data transmission of the data transmission schedule is scheduled to take place.

7. The method of claim 1, wherein the wearable computing device comprises a control receiver configured to receive information from a control channel, wherein the wearable computing device receives the data transmission schedule via the control channel, wherein the wearable computing device receives the data transmission via a data channel, and wherein the wearable computing device maintains the control receiver in a powered-on state, and the wearable computing device powers the data receiver up to receive data transmissions of the data transmission schedule and down when data transmissions of the data transmission schedule are not being received.

8. The method of claim 1, wherein receiving the data transmission schedule comprises powering up the data receiver and receiving the data transmission schedule with the data receiver, wherein readying the wearable computing device to receive the data transmission comprises the wearable computing device transmitting, to the camera device, an indication that the wearable computing device is ready to receive the data transmission.

9. The method of claim 1, wherein the wearable computing device displays images captured by and received from the camera device on the display mechanism.

10. A wearable computing device comprising:
    a data receiver configured to, when powered up, receive data transmissions via a data channel and from a wirelessly tethered camera device, wherein the data transmissions are based on a frame rate and a resolution of the camera device;
a display mechanism configured to display representations of the received data transmissions; and
a communications module configured to receive a data transmission schedule from the camera device, ready the wearable computing device to receive a data transmission of the data transmission schedule, receive the data transmission, and power down the data receiver after completing the reception of the data transmission.

11. The wearable computing device of claim 10, wherein the data receiver is powered down when the wearable computing device receives the indication of the data transmission, and wherein readying the wearable computing device to receive the data transmission comprises the wearable computing device powering up the data receiver.

12. The wearable computing device of claim 10, wherein the data transmission schedule comprises a sequence of one or more upcoming data transmissions from the camera device to the wearable computing device, and wherein readying the wearable computing device to receive the data transmission comprises the wearable computing device powering up the data receiver according to the schedule to receive the data transmission.

13. The wearable computing device of claim 12, wherein the data transmission schedule is based on data queued, at the camera device, for transmission to the wearable computing device, and a data channel capacity between the camera device and the wearable computing device.

14. The wearable computing device of claim 10, further comprising:
a data transmitter, and wherein the data transmitter remains powered up when the data receiver is powered down.

15. The wearable computing device of claim 10, wherein completing the reception of the data transmission comprises the wearable computing device receiving an indication, from the camera device, of when a subsequent data transmission of the data transmission schedule is scheduled to take place.

16. An article of manufacture including a non-transitory computer-readable medium, having stored thereon program instructions that, upon execution by a wearable computing device, cause the wearable computing device to perform operations comprising:

receiving a data transmission schedule from a wirelessly tethered camera device, wherein the wearable computing device includes a data receiver, and wherein the data transmission schedule is based on a frame rate and a resolution of the camera device;
readying the wearable computing device to receive a data transmission of the data transmission schedule;
receiving, with the data receiver, the data transmission at the wearable computing device; and
in response to completing the reception of the data transmission, powering down the data receiver, wherein the wearable computing device includes a display mechanism configured to display a representation of the received data transmission.

17. The article of manufacture of claim 16, wherein the data receiver is in a powered down state when the wearable computing device receives the data transmission schedule, and wherein readying the wearable computing device to receive the data transmission comprises the wearable computing device powering up the data receiver.

18. The article of manufacture of claim 16, wherein the data transmission schedule comprises a sequence of one or more upcoming data transmissions from the camera device to the wearable computing device, and wherein readying the wearable computing device to receive the data transmission comprises powering up the data receiver according to the schedule to receive the data transmission.

19. The article of manufacture of claim 16, wherein completing the reception of the data transmission comprises the wearable computing device receiving an indication, from the camera device, of when a subsequent data transmission will take place.

20. The article of manufacture of claim 16, wherein the wearable computing device comprises a control receiver configured to receive information from a control channel, wherein the wearable computing device receives the data transmission schedule via the control channel, wherein the wearable computing device receives the data transmission via a data channel, and wherein the wearable computing device maintains the control receiver in a powered-on state, and the wearable computing device powers the data receiver up to receive data transmissions of the data transmission schedule and down when data transmissions of the data transmission schedule are not being received.

* * * * *